US005175846A

United States Patent [19]

Bendahan

[11] Patent Number: 5,175,846

[45] Date of Patent: Dec. 29, 1992

[54] CLOCK DEVICE FOR SERIAL BUS DERIVED FROM AN ADDRESS BIT

[75] Inventor: Samuel Bendahan, Paris, France

[73] Assignee: U.S. Philips Corp., New York, N.Y.

[21] Appl. No.: 622,662

[22] Filed: Dec. 5, 1990

[30] Foreign Application Priority Data

Dec. 4, 1989 [FR] France ............ 89 16041

[51] Int. Cl.[5] ............ G06F 13/42

[52] U.S. Cl. ............ 395/550; 364/DIG. 1; 364/240; 364/260.1; 364/271.6; 364/270.2; 364/DIG. 2; 364/926.91; 364/927.93; 364/935.42; 364/934.3; 364/950

[58] Field of Search ............ 395/550; 364/718

[56] References Cited

U.S. PATENT DOCUMENTS 4,570,215 2/1986 Miura et al. ............ 364/140

*Primary Examiner*—Dale M. Shaw

*Assistant Examiner*—Robert S. Hauser

*Attorney, Agent, or Firm*—Jack D. Slobod

[57] ABSTRACT

In a microprocessor system provided with a central processing unit with an internal address and data bus arrangement connected to the central processing unit and to an operation codes memory (ROM) the clock of an external serial bus is obtained from connection to the least significant bit wire of the internal address bus. The central processing unit is operated in such a way that the addresses carried by the address bus, during an operation of writing on the external serial bus, are regularly incremented by unity, producing in the least significant bit wire a sequence of alternating ONES and ZEROS. For this purpose, the operation codes memory contains, in the locations corresponding to the addresses present on the internal address bus during a write operation, operation codes intended to establish the value of the datum on a port of the central processing unit to which the data wire of the external serial bus is connected. In order to read data from the serial bus, a shift register is provided between the data wire of the external serial bus and the internal data bus in order to enter data in parallel on the internal data bus. The clock input of this shift register is also connected to the clock wire of the serial bus.

7 Claims, 1 Drawing Sheet

CLOCK DEVICE FOR SERIAL BUS DERIVED FROM AN ADDRESS BIT

BACKGROUND OF THE INVENTION

The present invention relates to a device intended to supply a clock for an external bus of a serial type which includes at least one clock wire and one data wire, in a microprocessor system provided with a central processing unit with an internal address and data bus arrangement connected to the central processing unit and to an operation codes memory.

The invention is applied in particular in microprocessor systems used in automatic devices, for the control of professional or domestic electrical devices, such as for example audio-video systems. In the prior art, a device for a serial bus of the abovementioned type supplies the clock and the data by means of a plurality of instructions. This limits the data transfer speed on the bus.

SUMMARY OF THE INVENTION

The invention aims to provide a device by means of which a serial transfer can be obtained much more rapidly and to provide this by means of a simple and inexpensive equipment.

This is obtained because the clock wire of the external bus is connected to the least significant wire of the internal address bus.

Thus the writing on the serial bus can take place without the central processing unit having to read and execute operation codes which are normally necessary in order to establish the clock on the external bus, and the corresponding cycle times are saved.

In order to establish data on the data wire of the external serial bus, the latter is connected to a port of the central processing unit and the operation codes memory contains, in the locations corresponding to the addresses present on the address bus during a write operation on the serial bus, operation codes intended to establish the value of the datum on the said port of the central processing unit.

In the case in which it is desired to read data from the serial bus, the device is advantageously provided with a shift register between the external serial bus and the data wire of the internal data bus in order to enter data in parallel on the said internal data bus, and the clock input of this shift register is connected to the least significant wire of the internal address bus.

In order to use this shift register, it is good if the operation codes memory contains inactive operation codes in the locations corresponding to the addresses present on the address bus during the operation of loading the shift register.

Between the clock input of the shift register and the least significant wire of the internal address bus there is advantageously inserted an element to isolate, on demand, the said clock input from the said least significant wire.

The device is furthermore advantageously provided with an address decoder whose input is connected to the address bus of the system in order to put the shift register into operation when one or more specified addresses are presented on the address bus.

BRIEF DESCRIPTION OF THE DRAWING

The following description, with reference to the appended drawing describing a non-limitative example, will give a good understanding of how the invention may be embodied, wherein FIG. 1 shows a block diagram of the organisation of a system provided with a device according to the invention, and.

DETAILED DESCRIPTION OF THE PREFERRED EMBODIMENTS

Figure 1:
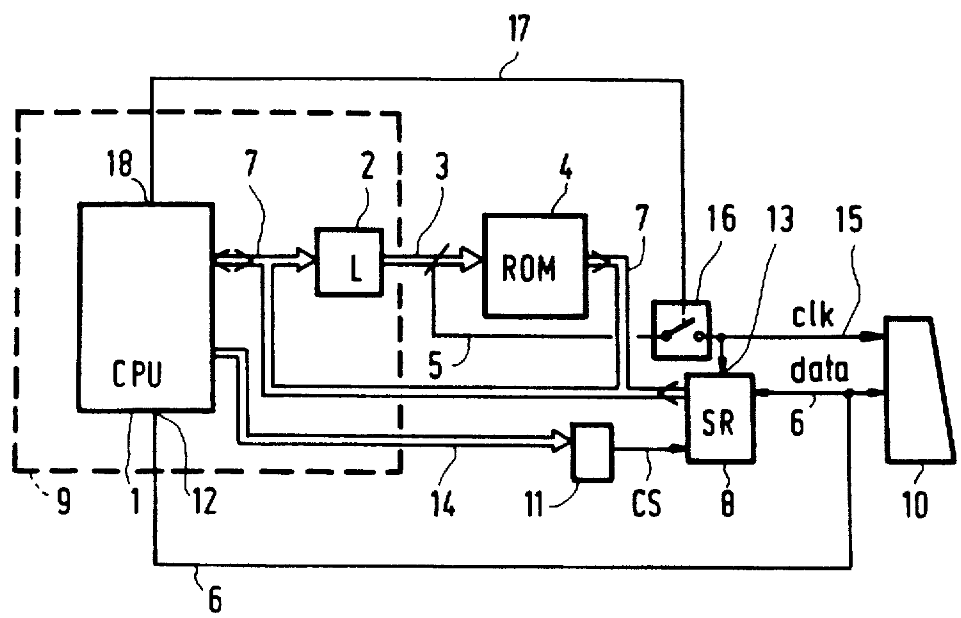

In order to simplify FIG. 1, only the elements essential for understanding the invention have been shown. A central processing unit 1 comprises normal logic elements (not shown) such as registers, a clock and a program counter and an arithmetic unit. A read only memory 4 (called ROM) contains the program operation codes: addresses incremented at each cycle time are presented to it and each time a code is read from it, the sequence of which in principle constitutes the program executed by the system.

The example described here is somewhat specific insofar as the microprocessor 1 is in this case a type which uses a mixed bus 7 alternately carrying data in eight bits and addresses (for example a microprocessor of the 8031 type). That is why this bus 7 is connected to a circuit 2 called a "latch" circuit whose purpose is to store an address at a certain moment, and which supplies this address on a bus 3 which is connected to the address input of the ROM memory 4. The mixed bus 7 carries only the eight least significant bits of the address, and the microprocessor therefore uses another bus 14 for the 8 most significant bits.

If there were two separate buses for the data and for the addresses, the principle of embodiment of the invention would be identical and those skilled in the art could easily adapt the present example: in particular, if the elements included inside the dotted outline 9 in the figure are considered in an overall manner, they can represent a system having two buses where the bus 7 is an 8-bit data bus and the buses 3 and 14 form a 16-bit internal address bus.

A single wire connection 6 is connected to a port 12 of the central processing unit for the data transfer. This connection 6 is the data wire ("data") of the external bus. The clock wire ("clk") of the external bus is referenced 15. The two wires 15 and 6 constitute the external serial bus and are connected to a peripheral unit 10.

In the prior art, this connection 15 would have been connected to one of the ports of the central processing unit, and in order to use such an arrangement, a sequence of machine instructions would have been used such as:

- set the port connected to the clock wire 15 to 0 ("clear port"),
- establish the datum on the port connected to the data wire 6 ("set port" or "clear port"),
- set the port connected to the clock wire 15 to 1 ("set port"),
- establish the datum on the port connected to the data wire 6 ("set port" or "clear port"),
- and so on.

Such a sequence lasts for a minimum of 3 or 4 basic cycles per half-period of the clock on the wire 15, and the clock frequency is thus a maximum of 200 kilobits/second, still in the case of using a type 8031 microprocessor.

According to the invention, the clock wire 15 of the external serial bus is connected to the least significant wire of the system address bus. In this case a wire 5 is connected to the least significant wire of the address bus 3, and the wire 15 is connected to this wire 5 by an element 16 whose function will be explained below and which is assumed for the moment to be equivalent to a short-circuit.

At each execution of a code, the next address is presented on the bus 3 only after execution of the code. In general the execution time of the various operation codes present in the memory 4 is variable: because of this, the least significant wire of the address bus could carry 1 and 0 states whose rhythm is irregular. This problem does not arise here as, in order to establish the value of the datum on the port 12, the operation codes memory contains each time, in the locations corresponding to the addresses present on the address bus during the operation, the operation code intended to establish the value of the datum on the external data wire 6. The application envisaged here relates to the control of a device on the basis of a fixed program which provides for the sending to a peripheral unit, via the serial bus, of a given value known in advance and which is always the same for the same program steps: the corresponding sequence is therefore written in the ROM memory.

During such a sequence, the operation codes are always of the same nature and each operation always takes the same time. For example if it is a matter of transmitting the byte 11100110, the successive operation codes will be: "clear port", "set port", "set port", "clear port", "clear port", "set port", "set port", "set port", assuming that the first bit is the least significant bit. Thus, during the execution of a "set port" or "clear port" instruction, the least significant address wire assumes the logic zero and one values, that is to say it constitutes a clock, without it being necessary to establish the clock signal values on a port of the microprocessor. It is consequently possible to transmit one datum per basic cycle and a frequency of one megabit/second can be obtained with a type 8031 microprocessor.

Figure 2:
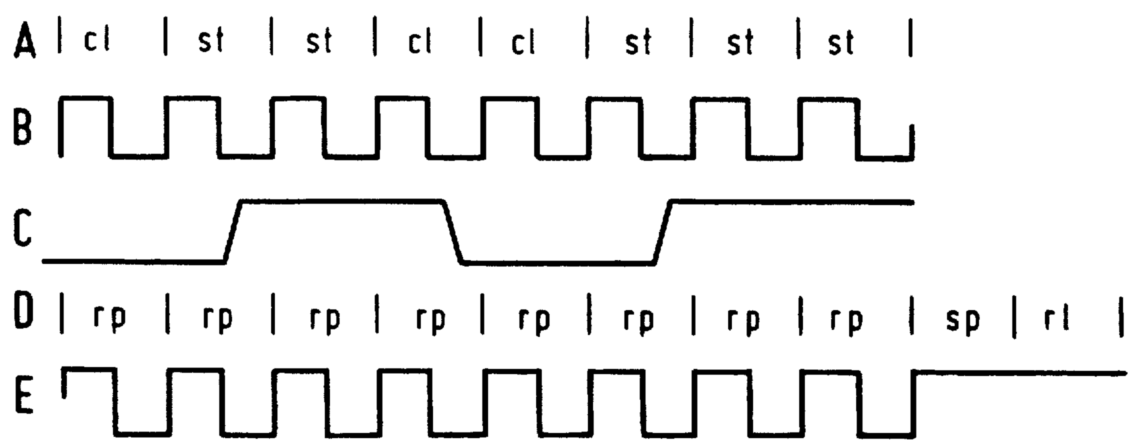
FIG. 2 shows the signals of the system during a write or read operation on the bus.

The signals present during such a sequence are shown in FIG. 2: in line A the vertical strokes mark the start of each basic cycle, and the operation performed in each cycle is indicated either by "cl" for "clear port", or by "st" for "set port"; line B shows the signal on the wires 5 and 15: at each basic cycle of the central processing unit of the 8031, the latter reads two words successively from the memory 4, that is to say the address is incremented by two steps, and because of this the least significant wire of the address bus successively assumes the values ONE and ZERO; line C shows the signal on the port 12 and the wire 6 resulting from the "cl" and "st" operations respectively.

In order to read data from the peripheral unit 10, the same procedure cannot apply: if the successive operation codes for setting a ONE on the port "(set port") or for setting the port to ZERO ("clear port") were replaced by codes for reading the value present on the wire 6 ("read port"), each operation cycle would erase the bit acquired during the preceding cycle, and it would be necessary to provide for storage between two successive read codes, which would slow down the operation. In order to solve this problem a shift register 8 is used, whose serial input is connected to the data wire 6 of the external serial bus and whose parallel output is connected to the data bus 7 of the central processing unit. The clock wire 15 of the serial bus is also connected to the clock input 13 of the shift register 8. The register 8 is put into operation by means of an instruction CS ("Chip Select") which is generated by an address decoding element 11: this element is arranged to recognize the addresses (predetermined) which are present on the address bus 14 during the loading of the register and to then supply the signal CS. The operation codes memory 4 contains inactive operation codes in the locations corresponding to the abovementioned addresses during the loading of the register 8. Thus these addresses are regularly incremented. After the number of basic cycles necessary for the register 8 to be full, it is necessary to stop filling it. It is for this purpose that the element 16 is provided and is placed between the clock input of the shift register and the least significant wire of the internal address bus, and controlled by the central processing unit by means of a control wire 17. This element serves to isolate the said clock input from the least significant wire. It is symbolised by a switch in the figure but it may assume other forms, provided that it is capable of causing the clock 15 either reproduce the signals on the wire 5, or to be immobilized after receiving an instruction for this purpose on the wire 17. In order to produce such an instruction, the ROM memory 4 contains, after the inactive codes mentioned above, a code which places the appropriate value on the port 18 connected to the wire 17 in order to stop the clock. The ROM memory 4 then contains a code which causes the parallel reading of the register 8 by the central processing unit 1. This sequence is illustrated in lines D and E of FIG. 2: in line D the vertical strokes mark the start of each basic cycle, and line E shows the clock on the wire 15. On line D the operation performed in each cycle is mentioned each time: "rp" signifies "read port" (inactive operation code but during which, because of the transition of the clock signal, a bit is read on the wire 6 by the register 8), "sp" signifies "set port" (placing the desired value on the port 18 in order to control the element 16 in order to stop the clock), and "rl" signifies "read latch" (that is to say to read, in parallel, the contents of the register 8).

At each basic cycle, the central processing unit reads two words successively from the memory 4 (in the case of the 8031 microprocessor), that is to say the address is incremented by two steps. Because of this, if an inactive code having only one byte is used, the value of the address must back-step for the next cycle, which disturbs the sequence of 0/1 states on the least significant wire of the address bus. For this reason an operation code formed of two bytes must be chosen, for example a "load register" code, a "relation jump" code or a "read port" code, which can be described as inactive codes with respect to the central processing unit in the context of the operation to be performed. In the case of a different microprocessor where the address incrementing during a reading of an operation code is by a single step, a NOP (No OPeration) code can be used.

Such a device can be used with advantage particularly when storage registers whose addressing does not require all of the wires of the address bus are used for the transferred data. The addresses present on the address bus for generating the clock of the wire 15 are then also used, at least in part, for addressing the storage registers. The advantage is particularly noticeable when the words to be sent on the external bus are often the same, and if the central processing unit is working as a master unit for the transmission.

I claim:

1. Device intended to supply a clock for an external bus of a serial type which includes at least one clock wire and one data wire, in a microprocessor system provided with a central processing unit with an internal address and data bus arrangement connected to the central processing unit and including a parallel address bus connected for addressing an operation codes memory, and an internal data bus, characterized in that the clock wire of the external bus is connected to a least significant bit wire of the address bus.

2. Device according to claim 1, for the outputting of data on the external bus, characterized in that the data wire of the external bus is connected to a port of the central processing unit.

3. Device according to claim 2, characterized in that a operation codes memory contains, in the locations corresponding to the addresses present on the address bus during a write operation on the serial bus, operation codes intended to establish the value of the datum on the aforesaid port of the central processing unit.

4. Device according to claim 1, characterized in that it is provided with a shift register between the data wire of the external serial bus and the internal data bus in order to enter data in parallel on the said internal data bus, and in that a clock input of this shift register is connected to the least significant wire of the internal address bus.

5. Device according to claim 4, characterized in that between the clock input of the shift register and the least significant bit wire of the address bus there is inserted an element to isolate, on demand, the said clock input from the said least significant bit wire.

6. Device according to claim 4, characterized in that it is provided with an address decoder whose input is connected to the address bus and whose output is connected for putting the shift register into operation when one or more specified addresses are presented on the address bus.

7. Device according to claim 4, characterized in that the operation codes memory contains, in the locations corresponding to the addresses present on the address bus during an operation of filling the shift register, operation codes for operations by the central processing unit which are inactive operations with respect to an operation performed on the external bus.

* * * * *